Jan. 21, 1936.  C. SMITH  2,028,529
CALCULATING MECHANISM
Original Filed Aug. 2, 1917    2 Sheets-Sheet 2

Witnesses:
Robert Irwin
Arthur W. Carberry

Inventor.
Clyde Smith

Patented Jan. 21, 1936

2,028,529

UNITED STATES PATENT OFFICE 2,028,529

CALCULATING MECHANISM

Clyde Smith, near Hopkinsville, Ky., assignor to International Communications Laboratories Incorporated, New York, N. Y., a corporation of New York Refiled for abandoned application Serial No. 184,132, August 2, 1917. This application April 12, 1927, Serial No. 183,215

40 Claims. (Cl. 235—92)

This application is a refiled application for original application Serial No. 184,132 filed August 2, 1917, and abandoned on Nov. 26, 1921.

My invention relates to calculating mechanism, and has for its special object to provide a machine for automatically calculating and indicating the increases or decreases in the credit-balances of traders in fluctuating-price commodities in accordance with fluctuations in the commodity-prices as registered on the apparatus.

Prefatorily.—Brokerage transactions, as on the Board of Trade or Stock Exchange, are usually conducted on "margins", and the broker, for his own protection, must keep closely informed on the sufficiency of the credit balance of each customer, or "trader", properly to "margin" his current deals. In practice, the trader deposits with his broker a sum of money which is only a fractional part of the full market price of the quantity of the commodity, or commodities, that he wishes to trade in, the fractional part, or "margin", being sufficient to compensate for a certain number of "points" change in the price of the commodity. The trader may either "buy" or "sell" the commodity. If he buys, he is "long"; if he sells, he is "short". With every advance in the market price of a commodity, the credit balance of the long trader in that commodity increases, while the credit balance of every short trader decreases; and with every drop in the market price, these conditions are reversed. Theoretically, each transaction of the broker is an outright purchase or sale. Should the market fluctuations result in a loss to the trader greater than is covered by his margin, the broker (in the first instance at least) is called upon to make good the excess loss. However, a single trader may be conducting transactions in a number of commodities, on some of which he is profiting while on others he is losing, or he may be "hedging" by both buying and selling the same commodity; and since the broker may use the gains of the customer on one deal to offset losses on another, it is, in general, of primary importance to the broker to know rather the aggregate credit balance of the trader than the results of the trader's individual deals. Should the credit balance of any trader become seriously impaired, the broker may close out all or part of the deals to save himself from personal loss, unless the customer rehabilitates his credit balance by a new deposit.

The keeping of margin accounts is a labor of obvious difficulty, and for a "margin clerk" to keep accurate track of the credit balances of all traders simultaneously is practically impossible. My invention provides mechanism for keeping a multiplicity of such accounts simultaneously. In general, the object of my invention is to provide, in association with a credit-balance-indicating counter for each trader, means for automatically varying the indications of said counters in appropriate response to movements of parts that register fluctuations of prices of commodities in which the respective traders are dealing. A further object of my invention is to give a quickly-readable indication of the scope of each customer's current trades, showing the commodities in which he is dealing, the quantity of each commodity involved in the transactions, and whether these are of purchase or sale. The indicating means showing the nature of the deals and the credit balances that are individual to the respective traders, I preferably make manually adjustable, to show changes in the character or extent of the deals, and to show any changes in the aggregate credit balances due to deposit or withdrawal of money, as distinguished from changes due to fluctuations of price that are automatically recorded in accordance with registration of market values.

To these ends I provide, in general, a multiplicity of instrument sets, each individual to a trader, and means common to all of the traders' sets for registering price variations. Each such individual instrument set includes a visible "credit indicator" for displaying the aggregate (or net) credit balance of the trader, and a visible "trade indicator" settable to indicate the various commodities traded in, the quantity of each commodity involved, the nature of each transaction, whether long or short. The price-registering means common to all of the instrument sets are movable to select the affected commodity and register variations in its market price. By suitable means, herein shown as electro-mechanical in character, the registration of price change in any commodity is translated to the several credit indicators of traders in that commodity, to each in accordance with, jointly, the extent of the price change, the quantity of the commodity involved in the trader's deal, and the nature of the trader's transaction (whether purchase or sale), so that each credit indicator is automatically adjusted to show the increase or decrease of the trader's balance due to the stated price change.

Mechanism for carrying my invention into effect may be made in widely differing forms and with widely varying electrical and mechanical arrangements, and in the drawings I have shown schematically an arrangement of parts that I have particularly designed for clearness of explanation rather than for refinement of mechanism or minimization of electrical appliances and circuits. The skill of electricians and mechanics, however, will readily suggest various mechanical substitutions and many consolidations and rearrangements of electrical parts and appliances that, if illustrated in the drawings, would only make the broader features of my invention the more difficult of explanation.

General organization

As herein shown, each trader's account is individually represented by a suitable credit indicator, or counter, as A, or $A^1$, manually settable in the first instance, as by device $A^2$, to indicate the initial credit balance, and thereafter operable automatically to indicate the amount of the trader's balance as this is varied by the market fluctuations. For each trader is also provided (preferably with its settable parts in displayed position) a trade indicator, as B or B' respectively, each illustratively shown as equipped for indicating nine commodities. In the specific form shown, each trade indicator is manually settable according to the commodity, the character of the transaction as to purchase or sale, and the quantity of the commodity involved in the deal. When these settable parts are conveniently displayed in association with the numerical indicator of the credit balance, the operator can tell at a glance whether the aggregate balance shown is sufficient to margin adequately trades of the scope shown by the trade indicator. Each trade indicator is shown as comprising a plurality of pairs of cams, $B^a$, $B^b$, etc., each pair representing a different commodity and each pair having one cam $b$, assigned to long transactions and its other cam $b^1$, assigned to short transactions, in that particular commodity. All of the cams of the several trade indicators, whether of the long order or the short order, are mounted for oscillation with a single shaft, $B^3$, (or equivalently a plurality of shafts operating in unison), and each cam is adjusted by angular displacement with respect to the carrying shaft. By such adjustment, the relation of the selected cam to a corresponding electrical switch, $b^3$ or $b^4$, is varied, the adjustment determining the linear extent of the cam that will act upon the switch when shaft $B^3$ is oscillated. These switches, shiftable to coact with any commodity-pair of cams, are associated with the respective credit indicators so that either switch may control the latter, through appropriate electro-mechanical means. Specifically, all of the credit indicators are arranged to be driven from a common shaft, $A^3$, from which they are normally disconnected, each credit indicator being connected in train with the shaft when, and as long as, a trade indicator cam coacts with the appropriate switch $b^3$ or $b^4$. Thus the "quantity-setting", or angular displacement, of each commodity cam will be one factor determining the duration of connection of the corresponding credit indicator with the uniform-speed shaft $A^3$, and consequently quantity of the commodity will be one factor determining the counting operation of the credit indicator.

Common to all of these trade indicators, B, $B^1$, etc., of the several customers, I provide means (shown as manually operable) to select any given commodity and to register its price variations. Thus C represents a commodity selector. As its arm is moved from a neutral position to any one of nine other positions assigned to the respective commodities, the switch pairs $b^3$, $b^4$, of each trade indicator will be brought into operative relation to the appropriate pair of commodity cams, $B^a$, $B^b$, or the like. D represents a "price register", shown as having levers, $D^1$, $D^2$, etc., each individual to a commodity and each movable to and fro to register, respectively, advance or drop in market price, the extent of each such lever movement indicating the extent of price change, whether quarter-point, half-point, or what-not. Any one of these levers, $D^1$, $D^2$, etc., operates to influence the counting operation of any one of the credit indicators according to the extent of the price change registered on the price indicator. Specifically I accomplish this by driving the trade indicator shaft $B^3$ at varying speeds, the speed being governed by the price register through a speed-changer, E, and commutator, F, and the speed being slowest when the change of price registered is largest, and vice versa. Therefore the duration of the engagement between any credit counter and uniform-speed shaft, $A^3$, (and therefore the amount of balance change recorded) will be dependent upon the extent of the price change (determining the rate of movement of the cam shaft $B^3$) as well as upon the quantity setting of the individual cam that, as above described, determines the active linear extent of the cam.

Generically these two provisions leave for consideration, as affecting the fundamental result, only the matter of long or short character of the transaction. Each indicator, A, $A^1$, must advance upon price-rise if the trader be long, and also advance upon price-drop if the trader be short, on the affected commodity. Though this result may be variously accomplished, I prefer so to construct that each price change, as registered, is followed by a full cycle of operation of the machine, divided into semi-cycles. During one semi-cycle, the common credit-indicator shaft $A^3$ runs in one direction, and control over the credit indicators A, $A^1$, is vested in cams of one order only (either $b$'s or $b^1$'s) while during the other semi-cycle the shaft $A^3$ runs reversely and control of the indicators vests in the cams of the other order. In this way, on a price rise, the indicators of long traders are connected with the indicator shaft during its advance movement only, and indicators of short traders are so connected only during the opposite shaft movement, while upon price-drop these conditions are just reversed.

Thus, to summarize the intended principle of operation by a simple example, credit indicator A of a trader who is long on a single commodity is preliminarily set to show his balance, and cam $b$ of group $B^a$ alone is set to function, being angularly displaced so that its linear capacity for co-operation with selector switch $b^3$ is proportional to the quantity of commodity involved in the deal. A short trader has his cam $b^1$ alone set. When a rise of price occurs in that commodity, the operator moves the arm of selector C to position $C^a$, shifting the selector switches into cooperation with the said cam pairs $B^a$. The corresponding commodity lever $D^1$ of the price register is moved forward the appropriate number of points to show the price rise, thereby shifting the commutating device F to position to control the appropriate gear couple of the change-gear mechanism E. These preliminaries having been effected, the machine is appropriately set in operation, as by a starting button, G, with shaft $A^3$ running at uniform speed, first forward for a semi-cycle, then reversely for another. During the first semi-cycle, cam $b$ of the long trader acts on switch $b^3$ and indicator A individual to that trader is maintained in driven connection with the shaft $A^3$ to increase the credit indication. The duration of this driving connection is the product of the linear extent of the active cam surface and the rate of movement of the cam, the first factor being determined by the quantity setting of the cam and the second factor by the speed of rotation of the cam shaft $B^3$, which in turn is governed by the extent of movement of the price indicating lever $D^1$. Therefore the credit indicator A automatically counts the profit due to the determined price change upon a determined quantity of the affected commodity. During the second semi-cycle, when shaft $A^3$ runs backward, cam $b^1$ of the short trader acts similarly on switch $b^4$, and so in the same fashion indicator $A^1$ is set backwardly, recording the short trader's loss.

With this preliminary understanding, the specific electro-mechanical apparatus may be described.

Mounting

Figures 3, 4, 5, 7, 8:
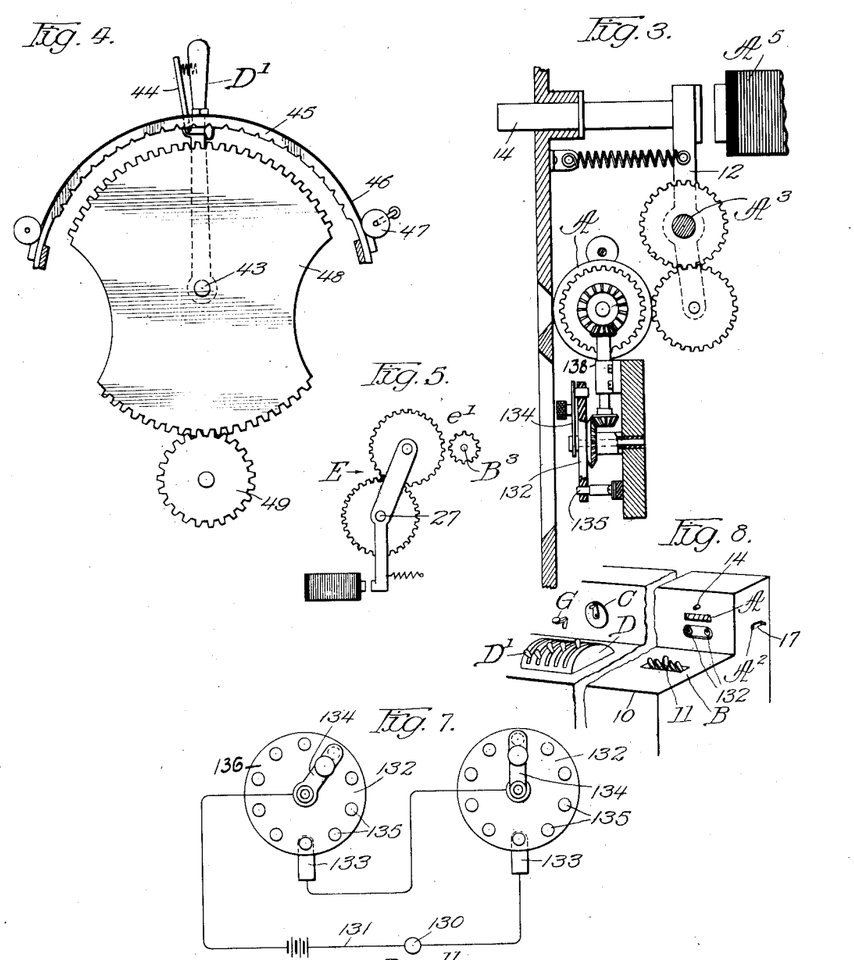
Figure 3 is a sectional detail of a portion of the cabinet, showing a convenient arrangement of settable parts.
Figure 4 is a detail of a price-register element.
Figure 5 is a diagrammatic detail of a gear-shifter element.
Figure 7 is a detail of an auxiliary signal device.
Figure 8 is a perspective illustration of a cabinet arrangement.

As schematically shown in Figure 8, a computing machine may display, through openings in its cabinet, 10, the reading line of each indicator A and the setting levers 11 respectively appurtenant to the commodity cams of the trade indicator B, in convenient relation for joint inspection.

Also conveniently mounted on the same or another cabinet will be the commodity selector C and the price register D.

Credit indicators

Each indicator, A or $A^1$, is a counter of usual form; it is entrained with shaft $A^3$ (Figure 3) by spring resisted movement of lever 12, either by electro-magnet $A^5$ or by pressing in a finger button, 14. While gear 15 of manual-reset device $A^2$ is thrown into mesh with a gear, 16, on the shaft $A^3$ and hand-lever 17 is being rotated, any counter may be reset by pressing in its button, 14. Normally, a spring, 18, holds gear 15 out of mesh and disposes pinion 19 to connect gears 16 and 20 so that shaft $A^3$ is rotatable with extension shaft 21.

Reversing gearing, and gear-changer E

Shaft $A^3$ is rotatable in either direction at uniform speed by constant-speed motor 22 working through reversing gear 23, normally spring-held to turn the shaft forwardly, and reversible by action of a magnet, 24. Motor shaft 25 also drives shaft $B^3$ in either direction and at varying speeds through reversing gear 26 and gear changer E. Shaft 27 of the gear shifter is normally run forward, but its direction is reversible by spring-resisted gear-shifter 26' when the magnet 28 is energized. The gear changer E provides a suitable number of gear elements, $e^1$, $e^2$, $e^3$, $e^4$, arranged to drive shaft $B^3$ at speeds proportional to registrable advances of commodity price, say, $\frac{1}{8}$, $\frac{1}{4}$, $\frac{3}{8}$, $\frac{1}{2}$, etc., each gear train being spring-held in idle position but movable (see Figure 5) to entrain the shaft $B^3$ whenever a respective one of magnets 31, 32, 33, or 34 is energized.

Trade indicators B, $B^1$

Figure 6:
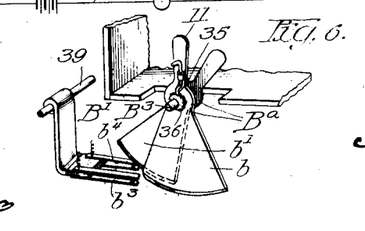
Figure 6 is a detail of a pair of commodity cams of a trade indicator.

Cams $b$ and $b^1$ for each of the respective commodities are angularly adjustable on the shaft $B^3$ by rocking the levers 11, moving the cams to positions determined by engagement of spring pawl 35 in suitable notches of the cam. When in zero, or neutral, position, the commodity cams of both the long and short orders, $b$ and $b^1$, are thrown to position where, when moved by oscillation of shaft $B^3$ they will make no contact with switches $b^3$ or $b^4$, but by unlatching either loosely-mounted cam (Figure 6) from a ratchet fast on the shaft $B^3$, as at 36, and turning the cam, its periphery may be made to overlap the plane of the axially shiftable switches $b^3$, $b^4$, to a linear extent indicative of the amount of commodity involved in the trade. Illustratively, a 10-position setting may take care of blocks of stock in 100 multiples, up to 1000 shares. In Figure 6, long cam $b$ is set at zero, and short cam $b'$ shows 300 shares sold. When shaft $B^3$ rocks 60° counter-clockwise and back, switch $b^4$ will be closed three-tenths of each said movement.

Commodity selector C

Figures 1, 2:
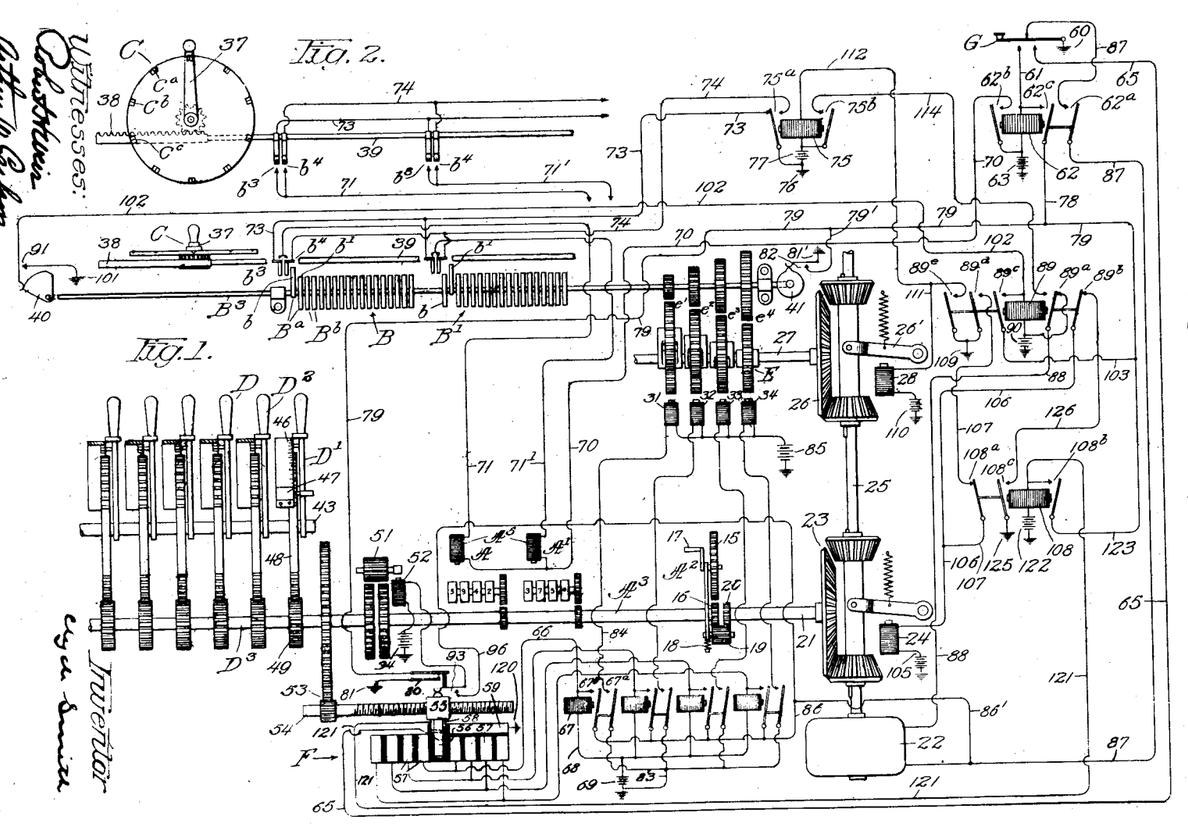
Figure 1 shows diagrammatically a complete installation suitable for handling the transaction of a plurality (2) of traders in a variety (say 9) of commodities.
Figure 2 is a diagram of the commodity selector.

Obviously, rotating arm 37 of selector C will, through the rack 38, shift the carrier-bar 39 for the switch pairs $b^3$, $b^4$, along the cam-group to register with different cams for each selector-position, the cam-pairs and selector positions being assigned to different commodities. Cam shaft $B^3$ is intended to receive the same full angular displacement on every operation and stop-cams 40 and 41 thereon, as will be hereafter explained, aid in this accomplishment.

Price selector D

Each lever, $D^1$, $D^2$, etc., is loose on shaft 43 and carries a spring-retracted latch, 44 (Figure 4) that normally holds the lever set, by coaction with an arcuate notched bar, 45, with respect to a price-index strip 46. The strip may be shiftably wound on rollers, 47, so that its exposed price-marks may easily be made to tally with the range of the current market. When grasped to the lever, latch 44 engages a gear element, 48, that acts on a pinion, 49, on shaft $D^3$, aligning with indicator shaft $A^3$. Normally disconnected coupling 51 leaves shaft $D^3$ free for movement independently from shaft $A^3$ to register a price change. As will be described later, shaft $A^3$ will always rotate first in direction opposite to the price-change-registering movement of shaft $D^3$, and coupling 51 will be operated by magnet 52 so as to run shaft $D^3$ back to its normal position. The stated provisions will enable the brushes of commutator F to be thrown right or left from normal accordingly as any lever, as $D^1$, is moved to show decrease or increase of price, and back to normal when shaft $A^3$ acts to restore shaft $D^3$ to normal position.

Commutator F

Shaft $D^3$ drives, through accelerating gearing 53, a screw 54 that shifts a carriage 55 to left or right accordingly as a lever, $D^1$, etc., is moved away from or toward the observer. (Figure 1). Carriage 55 carries a brush, 56, that shifts over contact-sets, 57, $57^1$, one to each side of a central, normal brush-position, corresponding contacts of the two sets controlling in common the respective gear-changer magnets 31 to 34. Also the carriage has a brush, 58, that is inert when moved leftwardly and is grounded on strip 59 when moved to the right.

Starting button

Preferably the mere selection of commodity and registration of its price does not start the machine, but only predetermines the action that will take place upon the machine's cyclic operation; and to start the machine, a starting button, G, is depressed, after which the full cycle of operations takes place, all subsequent actions being automatic. The circuits may most conveniently be traced incidentally to detailed descriptions of the operation of the specific device illustrated.

Operation and circuits

*Price advance registered.*—Assume A to represent a long trader's indicator; $A^1$, a short trader's; each interested in one commodity to the extent of 300 shares, as indicated by setting of cam $b$ of first group $B^a$ in commodity indicator B, and cam $b^1$ of group $B^a$ in indicator $B^1$. One-eighth point rise of price in that commodity occurs, so arm 37 of commodity selector C is moved by the operator to position $C^a$ and lever $D^1$ of the price register, individual to that commodity, is then moved (away from the observer, Figure 1; left, Figure 4) one notch of arc 45, turning shaft $D^3$ to gear-move the carriage 55 of the commutator F to the left far enough to make brush 56 contact with the first contact strip of the group 57. Lever $D^1$, latching in its new position, frees the shaft $D^3$ for return to normal position during the succeeding automatic operation of the machine.

*Relays 62 and 67.*—Now starting button G is depressed, leaving its normally dead back contact and throwing ground 60 on two front contacts, closing the two circuits as follows: Ground 60, starting switch, wire 61, starting relay 62, battery ground 63; also ground 60, starting switch, wire 65, commutator brush 56 and first contact to left, corresponding one of wires 66 to corresponding (left-hand) one of slow-acting relays 67, common bus wire 68 of said relays, and battery ground 69. The two relays 62 and 67, thus energized, control respectively the motor circuit and credit indicator circuit, and the gear-shifter circuit, and each controls its own locking circuit.

*Common battery.*—To simplify the wiring diagram, I have shown a number of battery indications and ground indications, but the various batteries, in fact, are all one, and the grounds are all a common return—although of course if desired for any reason plural batteries of equal potential might be employed as shown.

*Magnets $A^5$ and 31.*—Relay 62, closing its armature switches $62^a$, $62^b$ and $62^c$, prepares, through $62^a$ an operating circuit for the motor 22, but this circuit is not completed until the starting key is released.

Through switch $62^b$, magnet 62 closes the following circuit: ground-battery 63, switch $62^b$, wire 70 and coils of magnets $A^5$ (in parallel) to such of the respective contact pairs, $b^3$ and $b^4$, of the trade indicator as stand in contact with active cams, the first named, or long, contacts $b^3$ alone becoming energized, through wire 73, back contact of armature-switch $75^a$ for a shifter relay 75, the switch of which is connected between ground 76 and battery 77. Each short trader's switch $b^4$ is connected by common wire 74 with the front contact of the same armature switch $75^a$, so that later on in the operation, when magnet 75 is energized, the short contacts $b^4$ become live and contact $b^3$ becomes dead. Thus the credit counter A, and those of all long traders in the selected commodity, are thrown into gear with shaft $A^3$, but counters of short traders remain inert.

Through its armature switch $62^c$, relay 62 locks itself electrically in energized condition. See circuit: ground-battery 63, magnet 62, armature $62^c$ thereof, wires 78, 79, switch 80 (controlled by commutator carriage 55 and open only when the carriage stands in central normal position) to ground 81. Wire 79 has a branch, 79', through switch 82 to ground 81, controlled by cam 41 on cam shaft $B^3$ of the trade indicators B, B', so that when, presently, the said indicators begin moving, all locking circuits including wire 79 will be subject to control from that point. Therefore, it is obvious that the coil $A^5$ of the credit indicator A of each affected long trader will remain energized as long as (first) the switch $b^3$ of the trade indicator B remains closed and (second) the armature $75^a$ of magnet 75 remains retracted.

The gear-selector relay, 67 (left end of row), when energized as aforesaid, closes a circuit for the corresponding (left-end) gear-operating magnet 31, and also prepares to lock itself in an energized circuit. Its armature switch, $67^a$, closes circuit: ground 69, bus-wire 83, switch $67^a$, wire 84, magnet 31, to battery-ground 85. This circuit continues energized, since relay 67 continues to receive current after key G is released and restored to its back-contact, via battery-ground 69, relay 67, switch $67^b$, common wire 86, branch 86', and through wire 87, now-closed switch $62^a$, back-contact of the switch G, and its blade to ground 60. The magnet 67 is so wound or copper-clad as to be slow in its releasing operation, so that its armature is not retracted during the moment when key G passes from front contacts to back contact.

In résumé to this point: Starting key depression energizes the self-locking relay 62 that throws battery into the magnets of the credit indicators so that the selectors of long traders only (because of present deenergization of relay 75) dealing in that commodity (because of the inclusion of commodity cam-controlled switches $b^3$ in the respective indicator-magnet circuits); and also energizes the appropriate self-locking relay 67 that is automatically selected according to the extent of the price advance registered by lever D', and which relay 67 in turn serves battery to its dependent magnet 31, throwing into mesh the proper gear couple of the change-speed device E.

*Motor 22.*—Now the operator releases starting key G, which, returning to its back contact, starts the motor through circuit: ground 60, switch G (now closed to its back contact), wire 87 including switch $62^a$, motor 22, wire 88, back contact for armature-switch $89^a$ of a relay, 89, yet deenergized, and battery-ground 90.

The motor starts rotating the shaft 25, driving indicator-shaft $A^3$ forward (because magnet 24 is still deenergized and the spring-held reversing gear is conditioned as shown in Figure 1), and also driving (through the selected gear couple of the change-speed device E) the shaft $B^3$ of the trade indicator at a speed dependent upon the extent of the registered price change. As soon as this shaft starts, ground 81' is thrown on the relay-locking wire 79 at switch 82.

*First semi-cycle.*—Electrical connections remain unchanged during the ensuing first semi-cycle of automatic operation, that is, until cam 40 on the shaft $B^3$, after a 60° movement, closes its switch 91 for purposes to be described. During this first half-cycle (the chronological duration of which depends upon the selected speed ratio through the device E) each affected credit indicator of a long trader coacts with the constant-speed shaft $A^3$ and receives a forward setting of credit increase proportionate to the duration of closure of switch $b^3$, that in turn is dependent on the quantity adjustment of the cam $b$ and the speed of shaft $B^3$. During this semi-cycle, further, the commutator carriage is automatically returned to neutral or middle position. The carriage-controlled switch 93, closed when the carriage moved from the mid-position, is in a circuit that closed when starting key G returned to the normal position, viz: ground-battery 94, magnet 52, switch 93, wires 96, 86', 87, switch $62^a$, key G, ground 60. The magnet 52 thereupon threw in a clutch, 51, to engage shaft $D^3$ with shaft $A^3$, so that the forward movement of shaft $A^3$, reversed from shaft $D^3$ to both shafts 43 and 54, now works the carriage 55 back toward mid-position and also runs the set gear sector of the price register back to normal position. The commutator carriage 55, reaching home just as cam 40 of the trade indicator reaches the end of its forward throw (for it will be remembered that the distance of travel of the carriage at constant rate and the rate of movement of the cam for a constant distance are always proportional) opens the circuit for magnet 52 at switch 93, and so the carriage remains idle during the second semi-cycle of operation.

*Second semi-cycle relay 89.*—When the end of the first semi-cycle of operation is reached, and the indicators of all affected long traders have been set forward appropriately, the operation is automatically modified so that during a second, equal semi-cycle the credit indicators of all affected short traders will be set backward in kindred fashion. Thus, at the end of the first semi-cycle, as cam 40 passes from under switch 91, the momentary closure of that switch closes, for a second semi-cycle relay 89, a circuit: ground 101, switch 91, wire 102, relay 89, battery ground 90.

*Relay 75, magnets 24 and 28.*—By throwing armature $89^a$ (included, with its back contact, in the motor circuit) over to the front contact, the relay 89 momentarily stops the motor, so that the gear-reversing operations may be effected with the motor at rest. Its armature-switch $89^b$ (inert thus far) idly opens, but its other switches, $89^c$, $89^d$, $89^e$, all act to close circuits, that first mentioned closing a locking circuit, and the remaining switches controlling the circuit-reverser 75 for putting the indicator-magnets $A^5$ under control of the short trader's switch $b^4$, and the magnets for reversing gears 23 and 26. Switch $89^c$ closes current battery ground 90, relay 89, switch $89^c$, wire 103, to grounded wire 79. Switch $89^d$ closes circuit for the reverse-gear magnet 24 via battery ground 105, magnet 24, part of wire 106 (that leads to the yet inert switch $89^b$), branch 107 including closed switch $108^a$ (of yet inert relay 108), switch $89^d$ to ground 109. Upon the operation of magnet 24, the drive for gear 23 is shifted so that indicator shaft $A^3$ will rotate backward. Switch $89^e$ closes parallel circuits: ground-battery 110, magnet 28, wire 111, switch $89^e$, ground 109; and also circuit, ground 76, battery 77, relay 75, wire 112, switch $89^e$, ground 109. Upon the operation of magnet 28 the drive for gear 26 is shifted to reverse the direction of rotation of cam shaft $B^3$, and relay 75 is energized.

*Magnets $A^5$ and motor 22.*—Now, the drive for gears 23 and 26 having been shifted while the motor stood idle, relay 75 restarts the motor and also throws control of the credit-indicator magnets $A^5$ to the switches $b^4$ controlled by short trader cams $b^1$. Armature $75^a$ attracted to its front contact cuts wire 74 (connected with switches $b^4$ of the trade indicator) into service in lieu of wire 73 without otherwise affecting the described indicator-magnet circuit. Switch $75^b$ closes a battery circuit for the motor 22 via ground 76, battery 77, switch $75^b$, wire 114, switch $89^a$, wire 88, motor 22, wire 87, starting switch G, and ground 60.

*Second semi-cycle.*—The electrical conditions now obtaining will be maintained until cam 41 on the trade indicator shaft $B^3$, returns clear home and opens ground switch 82 for the locking circuit. Shaft $A^3$ of the credit indicators, running backward, will subtract, on the indicator of the short trader $A^1$ his loss due to the price rise, because only magnets $A^5$ for short traders are now energized, and shaft $B^3$, also running backwardly, will return toward the initial position.

*Release.*—On completion of the second semi-cycle, cam 41 on shaft $B^3$ opens the ground switch 82 for the locking circuit and (parallel switch 80 having been opened at the end of the first semi-cycle) the relays 62 and 89 are deenergized, and opening the circuits of relay 67 and magnets $A^5$, 31, 24, and 28, this deenergizes the latter, so that all parts drop to, or stop in, initial position.

*Operation on price-drop, relay 108.*—Should the price register lever $D^1$ be moved (toward the observer, Fig. 1) to show a drop in the market price, the salient change in operation follows from the fact that commutator carriage 55, now moving to the right, connects its brush 58 (heretofore inert) on contact strip 59 that is grounded at 120. This establishes, preliminarily to operation of the starting key, a circuit for relay 108, via 120, 59, 58, 121, coil 108, battery ground 122. Relay 108 locks itself via circuit, battery-ground 122, coil 108, switch $108^b$, wire 123 to 79, which is grounded through now-closed switch 80 to ground 81. This relay 108 establishes, subject to rupture by second-semi-cycle relay 89, the following circuit for reversing magnet 24: ground 125, switch $108^c$, wire 126, switch (heretofore inert) $89^b$ of relay 89, wire 106, coil 24, battery-ground 105. Therefore, during the first semi-cycle shaft $A^3$ will run backwardly, subtracting from the credit indicators of affected long traders (instead of adding thereon) and of course the backward rotation of the shaft $A^3$ will, when communicated to shaft $D^3$ of the price register, have the same effect to return the commutator carriage 55 and the price-gear to normal as followed from the first-described operation. All operations until the end of the first semi-cycle, under the now-assumed conditions, may be understood from what has preceded. At the end of the first semi-cycle the magnet 24 for the reversing gear 23 will be deenergized as a result of the operation of second-semi-cycle relay 89, and the circuits heretofore described afford provision to this end, for upon operation of the relay 89 due to closure of switch 91, the circuit for magnet 24 heretofore established through switch 108ᶜ is broken at 89ᵇ. While it will be remembered that on the price-rise operation previously described, energization of relay 89 resulted in energization of relay 24, it will be noted that the circuit which was closed, under the conditions first described, through branch 107 and switch 89ᵈ, is held open, under the conditions now being assumed, at 108ᵃ. In general, therefore, the only noteworthy variation of operation as between operation on price-rise and that on price-drop is that in the former shaft A³ runs first forward and then backward, whereas on price-drop this relation is reversed.

*Predetermined credit-signal*

As a refinement of such an installation as described, means may be provided for calling attention to the fact that the credit balance of any trader has reached a predetermined point. Preferably the indicating means comprises an alarm signal, which may be a bell, 130 (Fig. 7) or other annunciator, arranged in a circuit, 131, controlled by one or more switches, 132, in series, each having a fixed contact, 133, and a movable contact, 134, that is settable as to extent of displacement from the stationary contact. Each movable contact device is shown as an insulating plate, 136, having pins, 135, any one of which may receive contact finger 134, that is settable in connection with any selected pin. Each such movable contact-carrying plate is geared as at 138 (Fig. 3) to one of the counting wheels of the credit indicator—say, one to the "thousands" wheel and one to the "hundreds" wheel; and, manifestly, the two contact fingers 133 and 134 may be so set that when, and only when, the number wheels of the thousands and hundreds orders stand showing a certain credit balance—say, $2500—the two switches in series will close contact 131, to actuate the alarm signal. On the display board or casing the setting contact fingers 134 may be displayed as suggested in Figure 8, in suitable proximity to the credit indicator.

It will be understood that the specific arrangements shown—intentionally made electro-mechanical, rather than purely mechanical, in many places, on account of the greater facility with which electrical conventionalities may be shown and described—may have some or all of the electrical operations supplanted by mechanical substitutes, and that, in the broader aspects of my invention I do not desire to be understood as limiting its embodiment to details herein illustratively shown, as a wide variety of modifications may be made, within the scope of the appended claims; without departure from the scope of my invention.

It is known that there are computing scales which effect the multiplication of the weight of an article placed on the scale by a settable price. Such scales are not designed or usable for the purposes herein described. The machine herein described is not designed or usable for the purposes of weighing. While commodity quantity units with which my machine may deal are sometimes in terms of weight, there is no process of weighing related to the machine itself.

Having described my invention, I claim:

1. In a calculating machine, the combination of a counter, means settable in accordance with commodity quantity, but independent of the weight thereof, means settable in accordance with the extent of price change in said commodity, and means for operating the counter to a lower or higher value in accordance with, jointly, the settings of said settable means.

2. In a calculating machine, the combination of a counter, means settable in accordance with commodity quantity and with the character of the transaction, whether a purchase or sale, means settable in accordance with extent and direction of price change in the commodity, and means for automatically operating the counter in accordance with, jointly, the settings of said settable means.

3. In a calculating machine, the combination of a counter, trade-indicating means settable to indicate respective plural commodities and quantity of each commodity, means settable to indicate extent of price change in any said commodity, and means automatically operable to work the counter in accordance with, jointly, the settings of said settable means.

4. In a calculating machine, the combination of a counter, trade-indicating means settable to indicate respective plural commodities, the character of the transaction, whether purchase or sale, and the quantity of each commodity involved, means settable to indicate the direction and extent of price change in any said commodity, and means automatically operable to work the counter in accordance with, jointly, the settings of said settable means.

5. In a calculating machine of the character described, the combination of a plurality of credit indicators, means individual to each of them settable in accordance with quantity of commodity involved in the transaction, means common to all of them settable according to extent of price change in said commodity, and means automatically to actuate each credit indicator in accordance with, jointly, the settings of said settable means.

6. In a calculating machine, the combination of a plurality of counters individual to traders, a like plurality of trade-indicating means individual to traders, each settable to indicate respective plural commodities and quantity of each commodity, means, common to all of the aforesaid individual means, settable to indicate extent of price change in any said commodity, and means automatically operable to work each counter in accordance with, jointly, the settings of the individual and common settable means aforesaid.

7. In a calculating machine, the combination of a plurality of credit indicators individual to traders, a like plurality of trade-indicating means each individual to a trader, each settable to indicate respective plural commodities, the quantity of each commodity involved, and the character of the transaction, whether purchase or sale, means, common to all of the aforesaid individual means, settable to indicate direction and extent of price change in any said commodity, and means automatically operable to work the credit indicators each in accordance with, jointly, the settings of said individual and common settable means.

8. In a calculator of the character described, an instrument board having thereon a visible counter, visible trade-indicating means settable to indicate respective plural commodities and the quantity of each, settable means for registering price change in any said commodity, and automatic means for operating said counter in accordance, jointly, with the settings of said settable means, to vary the counter indications proportionately to the extent of price change in, and quantity of, the affected commodity.

9. In a calculator of the character described, an instrument board having thereon a plurality of visible counters, each individual to a trader, and a like plurality of visible trade-indicating means each individual to a trader and each settable to indicate respective plural commodities and the quantity of each commodity involved, settable means common to all of the counters and trade indicators for registering price change in any commodity, and automatic means for operating each counter in accordance with, jointly, the settings of said individual and common settable means, to vary each counter-indication proportionately to the extent of price change in, and quantity of, the affected commodity.

10. In a calculator of the character described, an instrument board having thereon a plurality of visible counters, each individual to a trader, and a like plurality of visible trade-indicating means each individual to a trader and each settable to indicate respective plural commodities, the character of the transaction, whether purchase or sale, and the quantity of each commodity involved, settable means common to all of the counters and trade-indicators for registering direction and extent of price change in any said commodity, and automatic means for operating each said counter in accordance with, jointly, the settings of said individual and common settable means, to vary each counter indication proportionally to the direction and extent of price change in, and quantity of, the affected commodity.

11. In combination, in a machine of the character described, a plurality of individual credit indicators, a plurality of individual trade indicators, each having movable parts severally representing a plurality of commodities, each said part settable according to quantity of that commodity involved and capable of controlling, by its movement, the operation of the corresponding credit indicator according to its quantity setting, and means, common to all of the credit and trade indicators, selectively operating to register the extent of price change in any commodity, arranged to condition the appropriate movable parts of each trade indicator to control the corresponding credit indicator, and also controlling in common all affected credit indicators in accordance with the extent of price change, whereby each credit indicator is operated proportionally to the quantity of commodity and extent of its price change, 12. The combination, in a machine of the character described, of a plurality of individual credit indicators, a common driving shaft therefor, means to connect each indicator with said driving shaft for operation thereby, a like plurality of individual trade indicators each having movable parts severally representing a plurality of commodities, each said part settable according to the quantity of that commodity involved, and arranged to control the connecting means for the corresponding credit indicator according to its quantity setting, a common drive shaft for said indicator parts, speed changing means for operating said credit and trade indicator shafts at different selected relative speeds, means common to all of the trade indicators selectively operable to register the extent of price change and the commodity affected, said means controlling the conditioning of the appropriate movable part of each said trade indicator for its stated operation, and, according to the extent of the price change registered, controlling the speed-relation between the stated shafts, whereby the extent to which each trade indicator is operated is dependent upon, jointly, the quantity of commodity involved and the extent of price change.

13. The combination, in a machine of the character described, of a plurality of individual credit indicators, a plurality of individual trade indicators each having movable parts respectively representing a plurality of commodities, each said part settable according to the quantity of that commodity involved and capable of controlling the corresponding credit indicator according to its quantity setting, means common to all of the credit and trade indicators selectively operable to register direction and extent of price change in any commodity and controlling the appropriate movable parts of the trade indicators to govern the operative association of each of them with its corresponding credit indicator, said registering means also controlling in common all affected credit indicators in accordance with the extent of price change, and means controlled by said registering means, for harmonizing the character of operation of the credit indicator, whether additive or subtractive, with the direction of the price change.

14. In a machine of the character described, the combination of a credit indicator, an operating shaft therefor, means for operating said shaft in opposite directions, during different portions of a cycle, means operatively to connect said indicator with said shaft, a trade indicator associated with said credit indicator, settable to indicate respective plural commodities and quantity of each commodity involved; means for indicating direction and extent of price change in any said commodity, and means controlled by said settable means automatically to connect said credit indicator with said shaft during such period of cyclic operation of the shaft as to register, additively or subtractively, proportionally to the character of the transaction, the quantity of commodity, and the extent of price change.

15. In a machine of the character described, the combination of a plurality of credit indicators, a common operating shaft therefor, means for operating said shaft in opposite directions, during different portions of a cycle, means operatively to connect each said credit indicator with said shaft, a trade indicator associated with each said credit indicator, settable to indicate respective plural commodities and quantity of each commodity involved, means for indicating direction and extent of price change in any said commodity, and means controlled by said settable means automatically to connect any said credit indicator with said shaft during such period of cyclic operation of the shaft as to register, additively or subtractively, proportionally to the character of the transaction, the quantity of commodity, and the extent of price change.

16. In a calculating machine, the combination of a plurality of credit indicators each individual to a trader, a common driving means therefor, means to engage each indicator with said driving means, a plurality of trade indicators each individual to a trader and each settable to indicate quantity of commodity, and, in common to said individual indicators, a price-change register settable according to extent of price change, and means automatically to engage each indicator with said driving means controlled jointly by the trade indicator individual to the trader and the price-change register common to the traders.

17. In a calculating machine, the combination of a plurality of credit indicators, a common driving means therefor, means automatically to operate said driving means in different directions at different portions of a cycle, to affect such indicators as are connected therewith additively or subtractively according to direction of driving-means-movement, means individual to the respective indicators each settable to indicate quantity of a commodity involved and to select the portion of the cycle for cooperation of the indicator and its driving means, and means, common to said indicators, settable according to direction and extent of price change in the commodity, controlling, by its setting as to direction of price change, the direction of operation of said driving means during the successive portions of the cycle.

18. In a calculator of the character described, a credit indicator, a shaft therefor, means settable to indicate character of the transaction whether of purchase or sale, means settable to indicate direction of price change, means responsive to the setting of one said settable means to drive said shaft in opposite directions during successive periods, and means controlled by the other said settable means to connect the credit indicator with said shaft during a selected one of said periods, thereby to accord the additive or subtractive response of the credit-indicator with the character of transaction and the direction of price change as indicated by said settings.

19. In a calculator of the character described, a credit indicator, driving means therefor for working said indicator according to the duration of its operative connection with the driving means, settable quantity-indicating means affecting the time of operative connection of said credit indicator with its driving means according to quantity-setting, and price change indicating means also affecting the said time of operative connection making the duration of said operative connection the product of extent of price change and quantity of commodity.

20. In a calculator of the character described, a credit indicator, driving means for working said indicator according to the duration of operative connection of said indicator with the driving means, a part controlling said operative connection, means settable according to commodity-quantity, and means settable according to extent of price change, one said settable means controlling the active extent of said connection-controlling part, and the other settable means controlling the speed of said connection-controlling part, whereby the duration of the stated operative connection is the resultant of price change and commodity quantity, jointly.

21. In a calculator of the character described, the combination of a credit indicator, driving means therefor, means controlling the extent of operative connection of said indicator with said driving means and settable to vary such extent, driving means for said controlling means, and means for varying the speed ratio of the two said driving means, settable to select the speed ratio, whereby the operation of the credit indicator will depend jointly on the settings of said two settable means.

22. In a calculator of the character described, the combination of a plurality of credit indicators, common driving means therefor, means each individually controlling the operative connection of each said indicator with said driving means according to its active extent and settable to vary its active extent, common driving means for said settable controlling means, and means for varying the speed ratio of the two said driving means, settable to select the speed ratio, whereby the operation of each credit indicator will depend upon, jointly, the settings of said settable means.

23. In a calculator of the character described, the combination of a plurality of credit indicators, common driving means therefor, means each individually controlling the operative connection of each said indicator with said driving means and settable to vary the extent of such connection, common driving means for said settable controlling means, means for varying the speed ratio between said two driving means, and means settable to condition for operation selected ones of said individual controlling means and to select the gear ratio, whereby the selected credit indicators will be operated all proportionally to the speed-ratio setting and each proportionally, further, to the setting of its individual controlling means.

24. In a calculating machine, the combination of a plurality of credit indicators, common driving means therefor, operable in two directions, means each controlling the operative connection of an individual credit indicator with said driving means settable to vary the extent of such operative connection and to determine the cyclic period of operation of the credit indicator, a common driving means for said settable controlling means, means for varying the speed ratio between said two driving means, and means settable to condition for operation selected ones of said individual controlling means and to select the gear ratio and to determine the direction of operation of the indicator-driving-means during different cyclic periods, whereby each affected indicator is operated proportionally to, jointly, the speed-ratio setting and the extent-setting of its controlling means, and in direction determined, jointly, by the selection of cyclic period and direction of operation of the indicator-driving means during that cyclic period.

25. In a machine of the character described, the combination of means respectively settable in accordance with commodity quantity, means settable sequently and in either direction in accordance with advance or drop of commodity price, registering means, and means for operating the registering means upon each transaction represented by a change of the price setting and accordantly with, jointly, the settings of said settable means.

26. In a machine of the character described, the combination of trade-indicating means settable to indicate respective plural commodities and quantity of each commodity, means settable to indicate extent of price change in any said commodity, registering means, and means automatically operable to work the registering means in accordance with, jointly, the settings of said settable means.

27. In a machine of the character described, a plurality of means each settable in accordance with quantity of commodity involved in a transaction, registering means individual thereto, means common to all thereof settable according to extent of price change in said commodity, and means automatically to actuate the registering means in accordance with, jointly, the settings of said settable means.

28. In a machine of the character described, the combination of a rotatable shaft, a register connectible therewith, a movable part controlling the register connection in accordance with the extent and duration of effective movement of such part, and means for varying the speed and thereby the duration of such effective movement.

29. In a machine of the character described, the combination of a rotatable shaft, a register connectible therewith, a movable part controlling the register connection in accordance with the extent and duration of effective movement of such part, means for setting such part to predetermine the effective extent of its movement, and means for varying the speed and thereby the duration of such effective movement.

30. In a machine of the character described, a register operating shaft, means for operating said shaft in opposite directions in different portions of a cycle, a register connectible with said shaft, manually operable means for determining the cycle-portion during which a register will be connected with said shaft, and means controlling the connection of said register with said shaft including a movable part controlling such connection in accordance with the extent and duration of effective movement of such part, said part being settable to determine its extent of movement, and speed-changing means for varying the rate of movement of said part to vary the duration of its effective movement.

31. The combination of a registering device, means settable in accordance with commodity quantity, independent of the weight thereof, means settable in accordance with the extent of price change in said commodity, and means for operating the registering device to a lower or higher value in accordance with, jointly, the setting of said settable means.

32. In a calculating machine, the combination of a plurality of registering devices, means for effecting their operation simultaneously and in unison according to commodity quantity, means settable in accordance with the extent of price change in said commodity, and means for selectively operating the registering devices to a lower or higher value in accordance with, jointly, the commodity quantity and the extent of price change.

33. In a calculating machine, the combination of a plurality of registering devices, means for effecting collective operation thereof according to commodity quantity, means settable in accordance with the extent of price change in said commodity, and means for selectively operating the registering devices to a lower or higher value in accordance with, jointly, the commodity quantity and the extent of price change.

34. In a calculating machine, the combination of a plurality of registering devices, means for effecting operation of such devices simultaneously and in unison, means settable in accordance with commodity quantity and the character of the transaction, means settable in accordance with the extent of price change in said commodity, and means for selectively operating the registering devices to a lower or higher value in accordance with, jointly, the settings of said settable means.

35. In a calculating machine, the combination of a counter settable to the amount of an equity interest in a given commodity at a given price, means settable in accordance with such commodity quantity, means settable in accordance with the extent of price change in such commodity, and means for operating the counter to a lower or higher value in accordance with, jointly, the commodity-quantity and price-change settings.

36. In a calculating machine, the combination of a counter, means settable in accordance with commodity quantity, means for selecting said settable means, means settable in accordance with the extent of price change in the selected commodity, and means dependent upon the joint setting of the commodity-quantity and price-change settable means for operating the counter to a lower or higher value in accordance with, jointly, the settings of said settable means.

37. In a registering machine, including, in combination, a plurality of registers, common driving means for said registers, means for connecting one or more of said registers with said driving means, variable settable means, and means for actuating the registers connected to said common driving means a predetermined time in accordance with the position of said settable means.

38. In a calculating machine the combination of a series of registering devices, multiplying mechanism for positioning the registering devices operatively engaged therewith in accordance with the duration of said engagement, selective means for operatively engaging predetermined selecting devices with said multiplying mechanism, and means for disengaging any one of the engaged registering devices from the multiplying mechanism after a predetermined interval.

39. In a registering machine the combination of a plurality of registers, common driving means for positioning said registers in accordance with the duration of the operative connection between said registers and said driving means, selective means for operatively connecting any one of said registers with said driving means, means individual to the selected register and settable to commodity quantity, additional means settable according to price change in this commodity, and means jointly governed by said settable means for controlling the duration of the operative connection between said register and said driving means.

40. In an apparatus of the class described, means for indicating a long transaction and other means for indicating a short transaction involving a particular commodity contained in an account, a credit balance register for indicating the balance of said account, means for conditioning said register for operation in either a forward or a backward direction in accordance with jointly the direction of a price change and the type of transaction in said commodity, and common driving means for thereafter rotating said register in the conditioned direction.

CLYDE SMITH.